US012807400B2

(12) United States Patent
Schaal et al.

(10) Patent No.: US 12,807,400 B2
(45) Date of Patent: Nov. 24, 2026

(54) CONTAINER, CAP AND MULTI-SERVINGS BEVERAGE DISPENSING SYSTEM

(71) Applicant: BELLO SOLUTIONS INC., Montreal (CA)

(72) Inventors: Marc Schaal, Montreal (CA); Clement Bouland, Montreal (CA)

( * ) Notice: Subject to any disclaimer, the term of this patent is extended or adjusted under 35 U.S.C. 154(b) by 1001 days.

(21) Appl. No.: 18/063,156

(22) Filed: Dec. 8, 2022

(65) Prior Publication Data

US 2024/0010421 A1 Jan. 11, 2024

(51) Int. Cl.

*B65D 85/804* (2006.01)
*A47J 31/40* (2006.01)
*A47J 31/41* (2006.01)
*A47J 31/44* (2006.01)
*A47J 31/46* (2006.01)
*A47J 31/52* (2006.01)

(52) U.S. Cl.

CPC ........ *B65D 85/8049* (2020.05); *A47J 31/407* (2013.01); *A47J 31/41* (2013.01); *A47J 31/4492* (2013.01); *A47J 31/468* (2018.08); *A47J 31/521* (2018.08); *A47J 31/525* (2018.08); *B65D 85/8058* (2020.05)

(58) Field of Classification Search

CPC ...... A47J 31/407; A47J 31/41; A47J 31/4492; A47J 31/468; A47J 31/521; A47J 31/525; B65D 85/8049; B65D 85/8058; H01G 4/224; H01G 4/32

USPC ........................................................... 99/283

See application file for complete search history.

(56) References Cited

U.S. PATENT DOCUMENTS 6,631,823 B2 * 10/2003 Stillinger ............. B65D 47/248 222/511
8,985,395 B2 3/2015 Tansey
9,701,527 B2 7/2017 Tansey, Jr.
9,783,403 B2 10/2017 Tansey, Jr.
10,512,357 B2 * 12/2019 Skalski ................. A47J 31/407
11,104,502 B2 * 8/2021 Espinosa .................. A23B 2/08
2002/0178932 A1 * 12/2002 Cai ......................... A47J 36/24 99/516

(Continued)

FOREIGN PATENT DOCUMENTS

EP 3178356 A1 6/2017
WO PCT/GB2011/052208 A2 5/2012

*Primary Examiner* — Steven W Crabb
*Assistant Examiner* — Ket D Dang

(57) ABSTRACT

Container for storing a liquid and allowing extraction of the liquid on-demand. The container comprises a casing for storing the liquid, the casing defining an aperture. The container comprises a resealable membrane covering the aperture of the casing, the resealable membrane being adapted for receiving a liquid extraction tube therethrough for on-demand liquid extraction from the casing, the resealable membrane automatically resealing the aperture upon withdrawal of the liquid extraction tube. The container comprises an air permeable membrane for balancing a pressure in the casing upon extracting liquid by the liquid extraction tube. The resealable membrane and the air permeable membrane are provided as a cap for closing the aperture of the casing. Alternatively, the casing, the resealable membrane and the air permeable membrane are provided as a capsule. A multi-servings beverage dispensing system is adapted for receiving the container in removable engagement.

20 Claims, 18 Drawing Sheets

(56) References Cited

U.S. PATENT DOCUMENTS

| | | | | |
|---|---|---|---|---|
| 2009/0007792 | A1* | 1/2009 | Glucksman | A47J 31/4407 99/287 |
| 2011/0081466 | A1* | 4/2011 | Lassota | A47J 31/0615 99/283 |
| 2012/0267396 | A1* | 10/2012 | Quinlan, Jr. | A47K 5/1202 222/394 |
| 2015/0217986 | A1* | 8/2015 | Tansey, Jr. | G06Q 30/0269 222/102 |
| 2015/0274412 | A1* | 10/2015 | Bisio | B65D 85/8046 426/115 |
| 2019/0110634 | A1* | 4/2019 | Iacobucci | A47J 31/46 |
| 2021/0127888 | A1* | 5/2021 | Affolter | A47J 31/0647 |
| 2021/0127891 | A1* | 5/2021 | Wei | A47J 31/3623 |
| 2021/0186257 | A1* | 6/2021 | Toriumi | A47J 31/4496 |
| 2021/0251419 | A1* | 8/2021 | Mori | A47J 31/4428 |
| 2021/0361112 | A1* | 11/2021 | Hobden | A47J 31/5251 |
| 2021/0362993 | A1 | 11/2021 | Shafir et al. | |
| 2022/0142393 | A1* | 5/2022 | Rehfuss | B67D 1/0078 |

* cited by examiner

100

100

110

CONTAINER, CAP AND MULTI-SERVINGS BEVERAGE DISPENSING SYSTEM

TECHNICAL FIELD

The present disclosure relates to the field of beverage dispensing systems. More specifically, the present disclosure presents a container, a cap and a multi-servings beverage dispensing system.

BACKGROUND

Customer expectations have radically changed over the past years and have shown a strong demand for water, low-calorie beverages, and functional beverages; while in the meantime, a part of the population wants to live an eco-friendly lifestyle and refuses to buy single-use bottled water.

There is also an increasing concern about the integrity of the public's municipal water quality and whether ordinary tap water is always safe to drink. In response to these concerns, people commonly buy bottled water as an alternative to tap water.

Most of the beverage dispensers, coffee machines and tea brewers on the market use single servings pods, which are often costly and criticized by the consumers who are aware of the massive pollution generated by single use containers. A growing number of consumers are therefore willing to use reusable or multi servings containers.

Viscous liquids, such as drink concentrates and syrups, often need to be measured out fairly precisely. Too much concentrate may make a drink too strong, while too little concentrate may make the drink too weak. For example, it is often hard to ascertain exactly how much syrup needs to be added due to the different viscosities. The ideal amount for one flavor may not be so optimal for another. Also, it is often difficult to assess how much syrup has been dispensed, especially when a bottle or container is almost empty and the last drops are being shaken out. Furthermore, if a bottle containing syrup is shaken too hard, too much syrup is released.

The manual addition of syrups may also be messy, especially when adding them to a vessel with a small opening, such as the addition of syrup to water. Particularly viscous liquid concentrates may not just flow through the mouth of a bottle, but might also flow down the sides of the bottles.

Therefore, there is a need for a new container, cap and multi-servings beverage dispensing system.

SUMMARY

According to a first aspect, the present disclosure provides a container for storing a liquid and allowing extraction of the liquid on-demand. The container comprises a casing for storing the liquid, the casing defining an aperture. The container comprises a resealable membrane covering the aperture of the casing. The resealable membrane is adapted for receiving a liquid extraction tube therethrough for on-demand liquid extraction from the casing. The resealable membrane automatically reseals the aperture upon withdrawal of the liquid extraction tube. The container comprises an air permeable membrane for balancing a pressure in the casing upon extracting liquid by the liquid extraction tube.

According to a particular aspect of the container, the resealable membrane and the air permeable membrane are provided as a cap for closing the aperture of the casing.

According to another particular aspect of the container, the casing, the resealable membrane and the air permeable membrane are provided as a capsule.

According to still another particular aspect of the container, the resealable membrane and the air permeable membrane form a single membrane.

According to yet another particular aspect of the container, the resealable membrane and the air permeable membrane are concentric.

According to another aspect of the container, the casing comprises an outlet port, the outlet port being adapted for releasable engagement into a corresponding inlet port of a beverage dispensing system, the aperture being defined by the outlet port.

According to still another aspect of the container, the container comprises a tag storing data related to the container, the tag allowing reading and optionally writing of the data by a contactless data reader.

According to a second aspect, the present disclosure provides a cap for a container. The cap comprises a body adapted for being affixed to the container. The body defines a complementary aperture, the complementary aperture covering an aperture of the container when the body is affixed to the container. The cap comprises a resealable membrane covering the complementary aperture of the body, the resealable membrane being adapted for receiving a liquid extraction tube therethrough for on-demand liquid extraction of a liquid stored in the container, the resealable membrane automatically resealing the complementary aperture upon withdrawal of the liquid extraction tube. The cap comprises an air permeable membrane for balancing a pressure in the container upon extracting liquid by the liquid extraction tube.

According to a particular aspect of the cap, the body defines a second complementary aperture, the air permeable membrane covering the second complementary aperture of the body.

According to another particular aspect of the cap, the resealable membrane and the air permeable membrane form a single membrane.

According to still another particular aspect of the cap, the resealable membrane and the air permeable membrane are concentric.

According to yet another particular aspect of the cap, the cap comprises a tag storing data related to the container, the tag allowing reading and optionally writing of the data by a contactless data reader.

According to a third aspect, the present disclosure provides a multi-servings beverage dispensing system. The beverage dispensing system comprises a container engaging inlet port adapted for removably engaging a container. The beverage dispensing system comprises the container engaged in the container engaging inlet port. The container comprises a casing storing an ingredient liquid, the casing defining an aperture. The container comprises a resealable membrane covering the aperture of the casing, the resealable membrane being adapted for receiving a liquid extraction tube therethrough for on-demand ingredient liquid extraction from the casing, the resealable membrane automatically resealing the aperture upon withdrawal of the liquid extraction tube. The container comprises an air permeable membrane for balancing a pressure in the casing upon extracting ingredient liquid by the liquid extraction tube. The beverage dispensing system further comprises the liquid extraction tube slidably movable between a retracted position and an extended position, the liquid extraction tube not being in contact with the resealable membrane when in the retracted position, an end portion of the liquid extraction tube being received through the resealable membrane when in the extended position. The beverage dispensing system comprises an actuator adapted for moving the liquid extraction tube between the retracted position and the extended position. The beverage dispensing system also comprises means for transferring the ingredient liquid extracted from the casing by the liquid extraction tube to a mixing unit, a tank for storing another liquid, and means for transferring the other liquid from the tank to the mixing unit. The beverage dispensing system comprises the mixing unit for receiving and mixing the ingredient liquid transferred to the mixing unit and the other liquid transferred to the mixing unit. The beverage dispensing system also comprises a mixing unit outlet for pouring a content of the mixing unit.

According to a particular aspect of the multi-servings beverage dispensing system, the means for transferring the ingredient liquid extracted from the casing by the liquid extraction tube to the mixing unit and the means for transferring the other liquid from the tank to the mixing unit respectively comprise an ingredient pump and another pump.

According to another particular aspect of the multi-servings beverage dispensing system, the beverage dispensing system comprises a controller, the controller comprising electronic means for controlling operations of the beverage dispensing unit.

According to still another particular aspect of the multi-servings beverage dispensing system, the means for transferring the ingredient liquid extracted from the casing by the liquid extraction tube to the mixing unit and the means for transferring the other liquid from the tank to the mixing unit respectively comprise an ingredient pump and another pump. The controller automatically calculates respective time and speed of operation of the other pump, and respective time and speed of operation of the ingredient pump.

According to yet another particular aspect of the multi-servings beverage dispensing system, the controller is adapted to exchange information with a remote computing device via a communication interface of the controller.

According to another particular aspect of the multi-servings beverage dispensing system, the container further comprises a tag storing data related to the container, the beverage dispensing system further comprising a contactless data reader adapted for reading and optionally writing the data stored by the tag.

According to still another particular aspect of the multi-servings beverage dispensing system, the resealable membrane and the air permeable membrane are provided as a cap for closing the aperture of the casing; or the casing, the resealable membrane and the air permeable membrane are provided as a capsule.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

The present disclosure aims at providing a compelling alternative to bottled water and other water-based ready-to-drink beverages, by disclosing a new multi-servings beverage dispensing system. The beverage dispensing system is meant to offer a convenient, reliable, and cost-effective beverage solution to consumers' beverage needs. The beverage dispensing system is adapted to produce filtered water, as well as other unique beverages, through a container adapted for storing a liquid and allowing extraction of the liquid on-demand. For example, the container stores a liquid concentrate, which is mixed (by the beverage dispensing system) with filtered water, to produce a beverage. Instead of filtered water, the liquid concentrate may be mixed with any of the following: still (not sparkling) water, flavored water, enhanced water, infused water, and an alcoholic drink.

The beverage dispensing system is adapted to offer the following functionalities and benefits. Providing on-demand filtered water, by filtering the eventual bad taste, unhealthy contaminants or particles present in water. Providing on-demand custom beverages, by preparing a variety of appealing beverages, produced with filtered water, the consumer having the option to control the level of infusion of each beverage. Reducing carbon dioxide ($CO_2$) emissions, by avoiding transport of heavy bottled beverages to the point of consumption. Saving space, by avoiding stockage of voluminous beverage containers (e.g. in a fridge at home or an the office). Providing health benefit, resulting from more convenient and improved hydration options, including better concentration. Providing distribution benefit, the containers being light and valuable enough to be shipped directly to consumers at low shipping costs.

Figure 1:
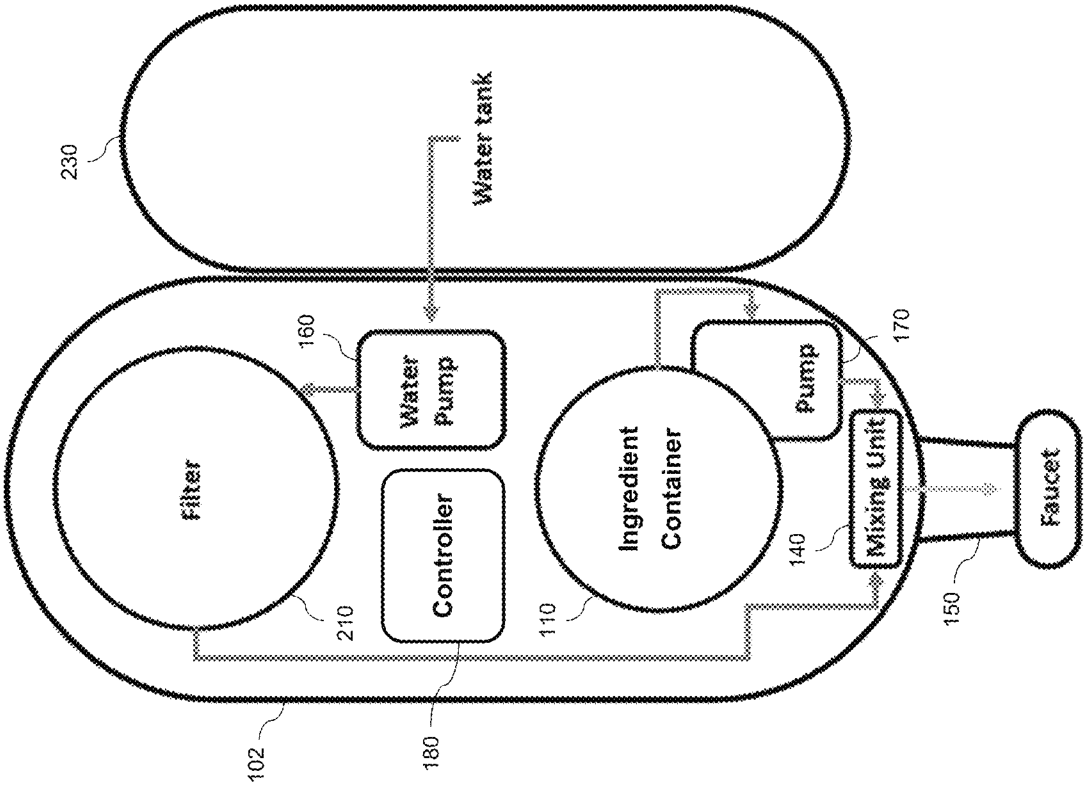
FIG. 1 is a top view of a beverage dispensing system.
Figure 2:
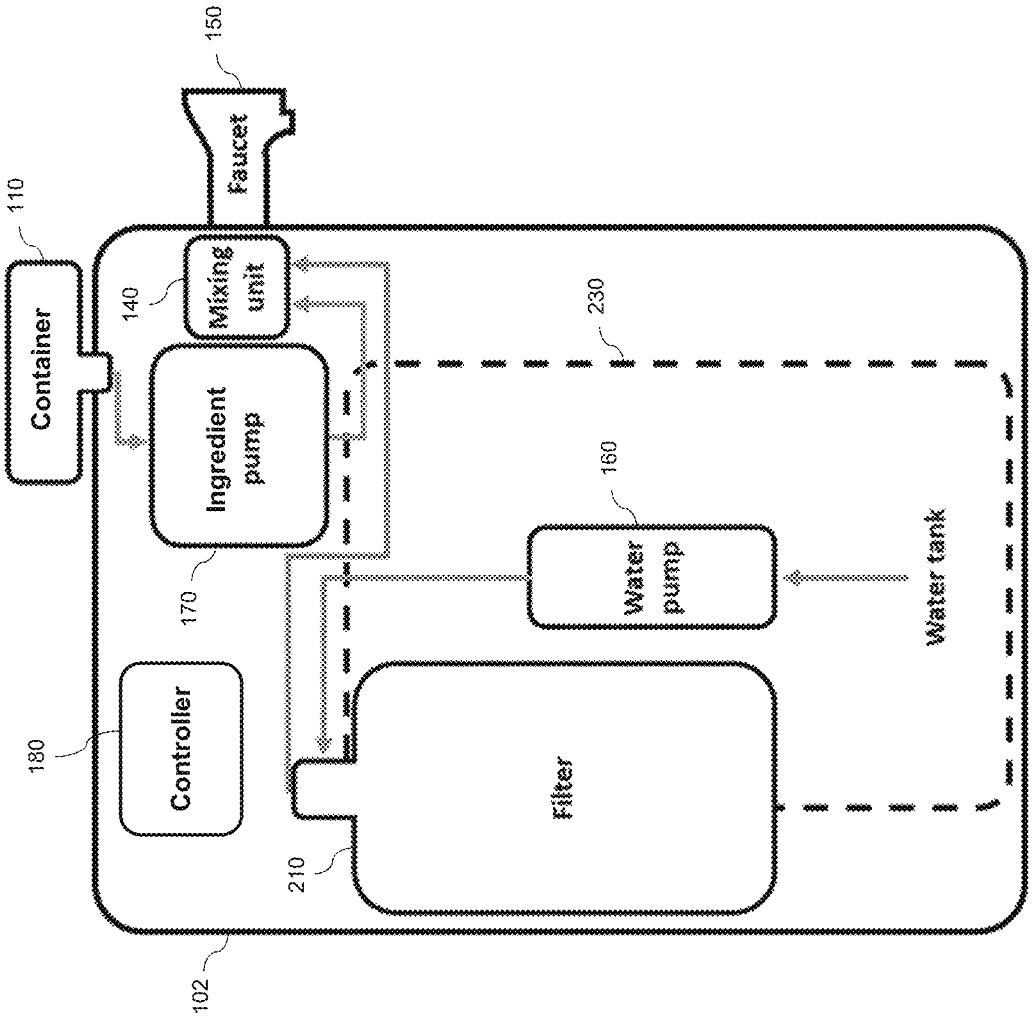
FIG. 2 is a front view of the beverage dispensing system of FIG. 1.
Figure 3:
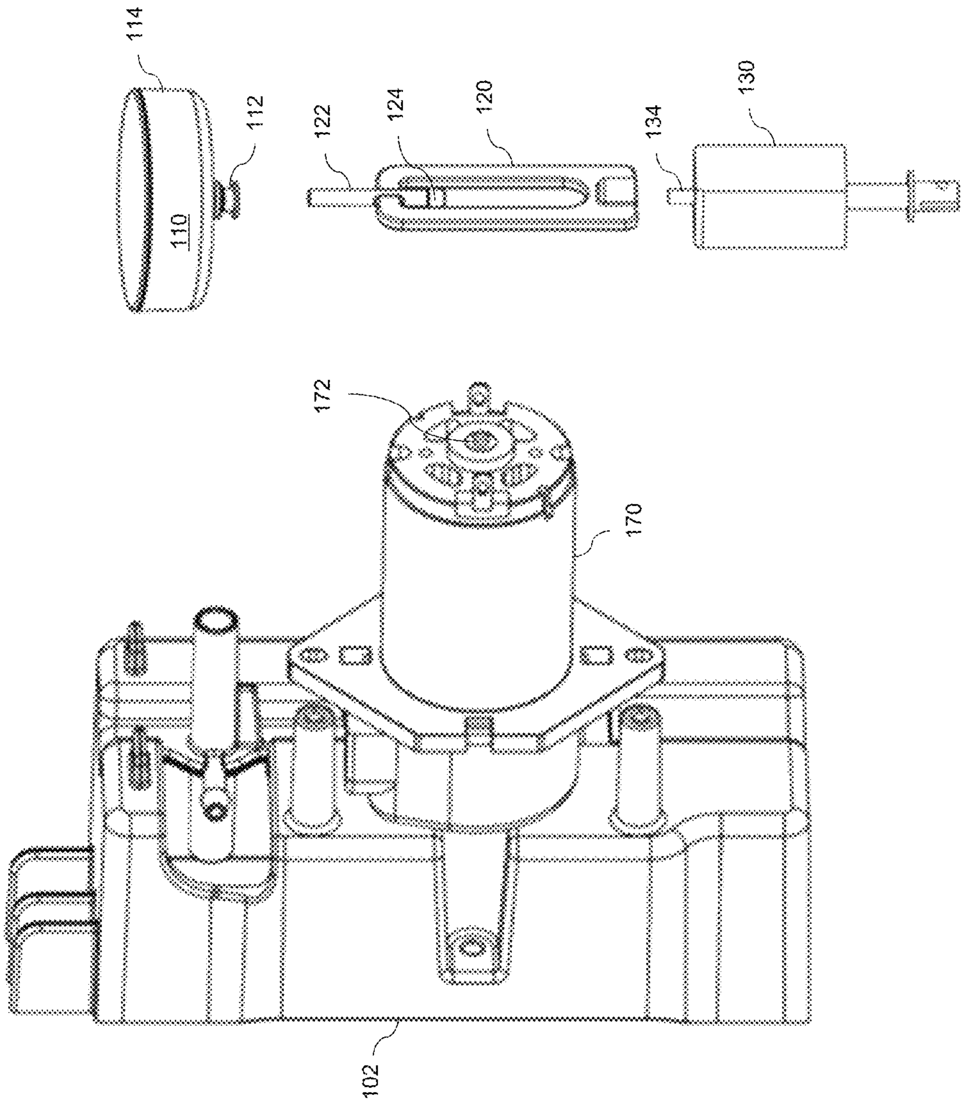
FIG. 3 is a perspective view comprising additional components of the beverage dispensing system of FIGS. 1 and 2.
Figure 4:
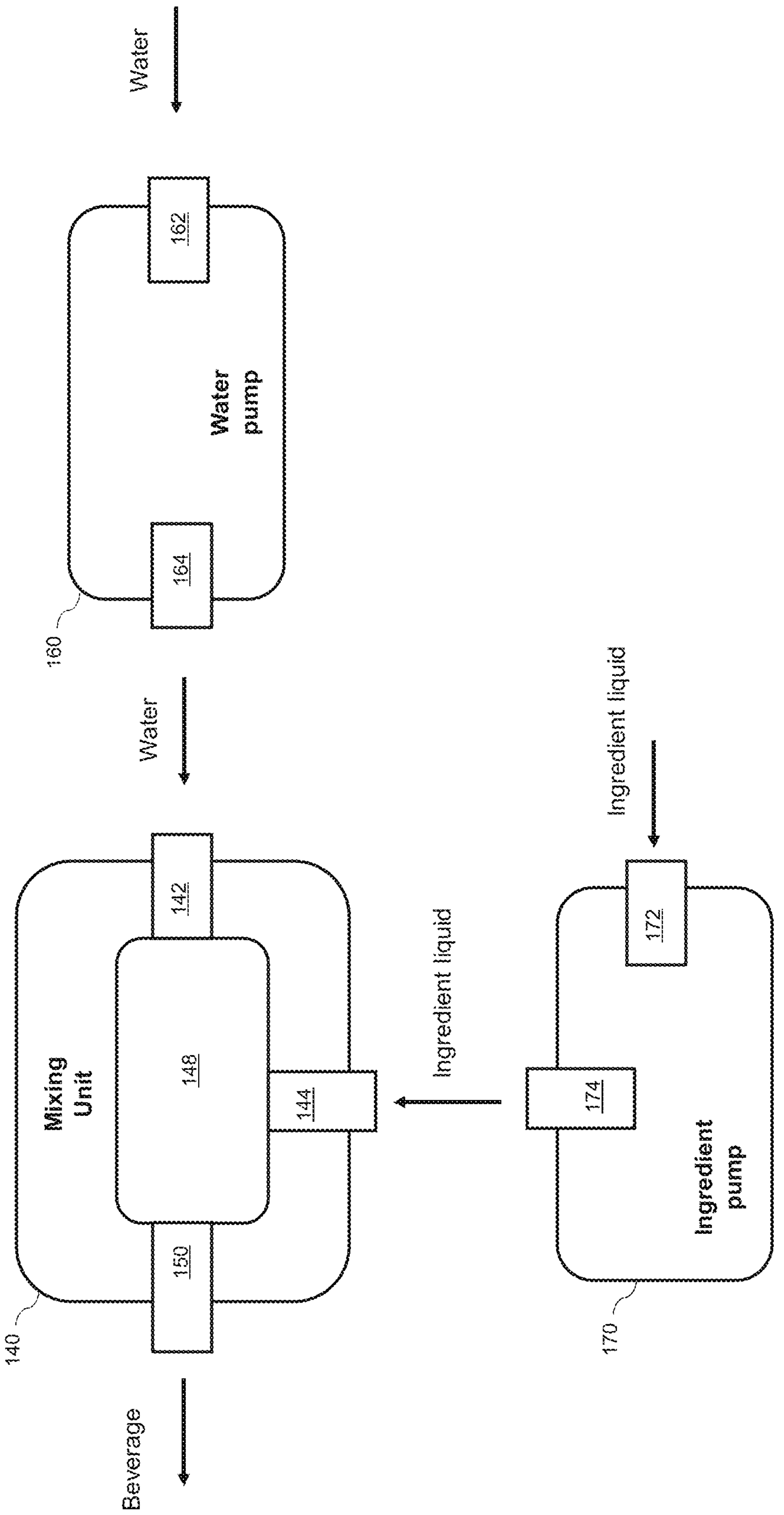
FIG. 4 is a functional view of interactions between components of the beverage dispensing system of FIGS. 1 and 2.
Figure 5:
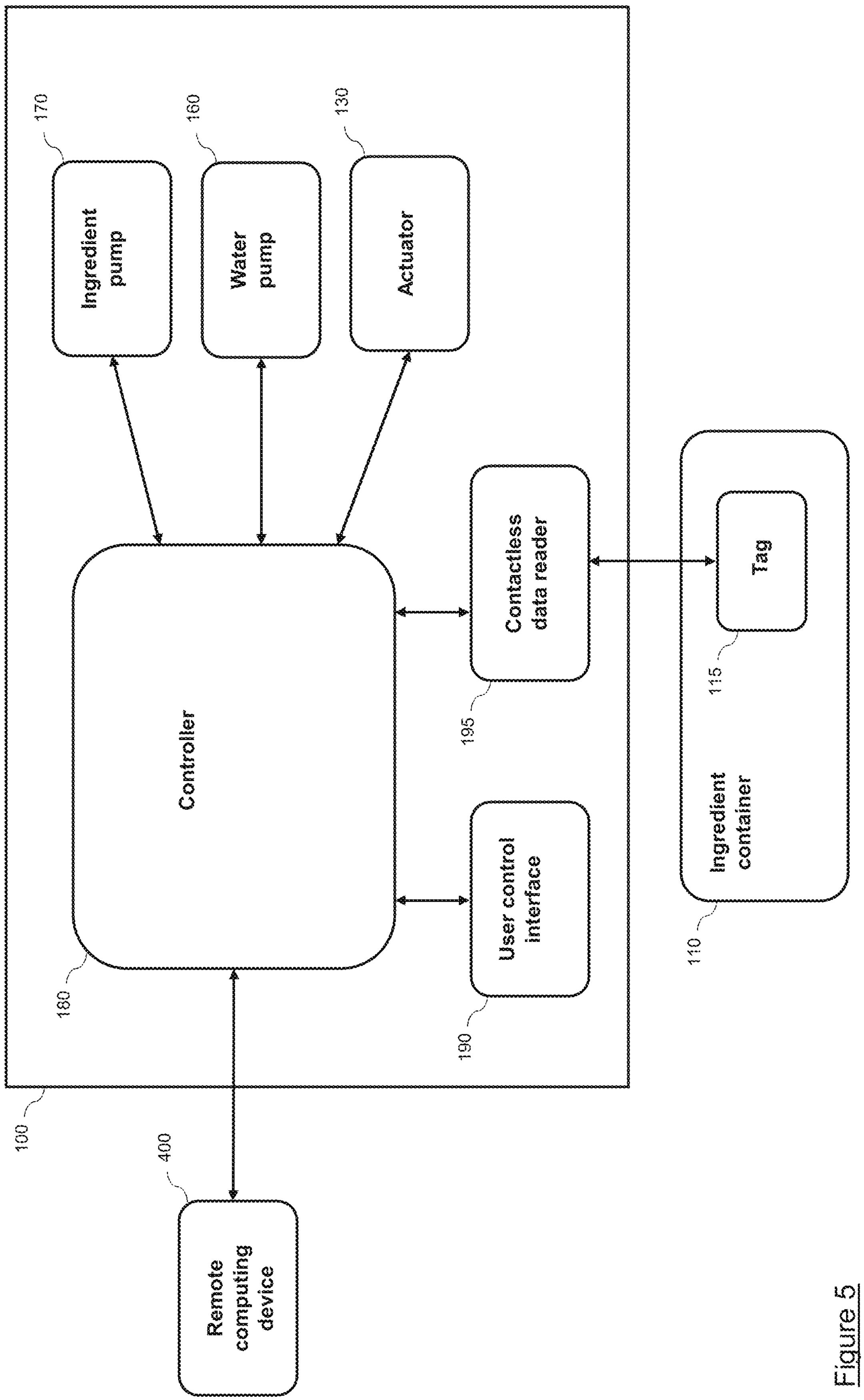
FIG. 5 is another functional view of interactions between components of the beverage dispensing system of FIGS. 1 and 2.

Reference is now made concurrently to FIGS. 1, 2, 3, 4 and 5. FIGS. 1 and 2 are respective top and front views of a beverage dispensing system 100. FIG. 3 is a perspective view comprising additional components of the beverage dispensing system 100 not represented in FIGS. 1 and 2 for simplification purposes. FIGS. 4 and 5 are functionals view of interactions between components of the beverage dispensing system 100.

The beverage dispensing system 100 comprises a housing 102 (illustrated in FIGS. 1, 2 and 3), a water tank 230

(illustrated in FIG. 1), a water pump 160 (illustrated in FIGS. 1, 2, 4 and 5), a filter 210 (illustrated in FIGS. 1 and 2), an ingredient container 110 (illustrated in FIGS. 1, 2 and 5), an ingredient pump 170 illustrated in FIGS. 1, 2, 3, 4 and 5), a mixing unit 140 (illustrated in FIGS. 1, 2 and 4), a mixing unit outlet 150 (illustrated as a faucet in FIGS. 1, 2 and also illustrated in FIG. 4), a controller 180 (illustrated in FIGS. 1, 2 and 5), a user control interface 190 (illustrated in FIG. 5), a liquid extraction tube 120 (illustrated in FIG. 3) and an actuator 130 (illustrated in FIG. 3).

The beverage dispensing system 100 is multi-servings and is adapted for preparing and dispensing a custom beverage. The beverage is prepared by mixing water contained in the water tank 230 and a liquid contained in the ingredient container 110. Examples of liquids contained in the ingredient container 110 have been provided previously. The container 110 is referred to as the ingredient container, since the liquid contained in the container 110 is an ingredient which is mixed with the liquid (generally water) contained in the water tank 230, to dispense a customized beverage (e.g a beverage having a customized flavor due to the flavor of the ingredient). Thus, the liquid contained in the ingredient container 110 will also be referred to as the ingredient liquid. Furthermore, as mentioned previously, the water tank 230 is not limited to containing water, but may also contain an alcoholic beverage, etc. Thus, although the liquid contained in the water tank 230 is referred to as water in the rest of the description, the beverage dispensing system 100 is adapted to process other types of liquids contained in the water tank 230.

The arrows in FIGS. 1 and 3 schematically illustrate the respective flows of water and ingredient liquid between components of the beverage dispensing system 100. Similarly, the arrows in FIG. 4 schematically illustrate the respective flows of water, ingredient liquid and beverage involving the water pump 160, the ingredient pump 170 and the mixing unit 140.

The water tank 230 is generally a removable and refillable water tank, the housing 102 being adapted for receiving and removing the water tank 230, as is well known in the art (e.g. in a manner similar to water tanks used for pod based coffee infusers).

In an exemplary implementation, a water tank engaging port (not represented in the Figures for simplification purposes) is mounted on the housing 102 and connected in liquid communication with a water pump inlet 162 (schematically represented in FIG. 4) of the water pump 160. The water tank 230 comprises a bottom port (not represented in the Figures for simplification purposes) configured for saleably and removably engaging the water tank engaging port on the housing 102. The removable water tank 230 also comprises a reclosable top opening for allowing a user to fill the water tank 230 with water. Thus, the water contained in the water tank 230 is made available to the beverage dispensing system 100 via the water pump 160. Alternatively, the water tank 230 is directly connected to a municipal water network.

The water pump 160 is mounted inside the housing 102. The water pump 160 comprises the previously mentioned water pump inlet 162 in liquid communication with the water source 230 via the previously mentioned water tank engaging port. The water pump 160 also comprises a water pump outlet 164 (schematically represented in FIG. 4) in liquid communication with a mixing unit water inlet 142 (schematically represented in FIG. 4) of the mixing unit 140. This configuration is used when the beverage dispensing system 100 does not comprise the water filter 210.

Optionally, the beverage dispensing system 100 further comprises the water filter 210 in serial liquid communication between the water pump 160 and the mixing unit 140 (more specifically in serial liquid communication between the previously mentioned water pump outlet 164 of the water pump 160 and the previously mentioned mixing unit water inlet 142 of the mixing unit 140).

In an exemplary implementation, the water filter 210 is a user selectively removable water filter, and the beverage dispensing system 100 comprises a removable filter mounting arrangement for removably receiving the water filter 210. The filter mounting arrangement is generally located along a rear portion of the housing 102. Thus, after a predetermined usage or volume of filtered water, the user may conveniently proceed with replacing the removable water filter 210 with a new one. The spent removable water filter may be appropriately recycled or disposed of according to the manufacturer instructions.

The ingredient container 110 is a removable, single-use or refillable ingredient container. The ingredient container 110 comprises a casing 114 (represented in FIG. 3) having a sufficient capacity for storing ingredient liquid for one serving or for multi-servings of the custom beverage served by the beverage dispensing system 100. The ingredient container 110 (in particular the casing 114) can be made of a recyclable material or material(s).

In an exemplary implementation, the casing 114 comprises a container outlet port 112 (represented in FIG. 3) through which the liquid stored inside the casing 114 is extracted. A detailed description of the ingredient container 110 will be provided later in the description.

The beverage dispensing system 100 further comprises a container engaging inlet port (not represented in the Figures for simplification purposes). The container engaging inlet port is generally mounted along an upper portion of the housing 102. The container engaging inlet port is adapted for removably engaging the ingredient container 110. The respective design of a container engaging inlet port and corresponding ingredient container 110 allowing removable engagement of the ingredient container 110 into the container engaging inlet port is well known in the art of beverage dispensing systems.

In an exemplary implementation, the container engaging inlet port defines a container port engaging cavity (not represented in the Figures for simplification purposes) extending at least slightly inwardly relative to the upper portion of the housing 102. The container port engaging cavity is suitably sized and configured for removably engaging therein in a snug-fit relation the container outlet port 112 of a suitable ingredient container 110 containing an ingredient liquid. The container engaging inlet port further defines an inlet port guide opening (not represented in the Figures for simplification purposes) extending coaxially centrally and inwardly relative to an innermost surface portion of a container port engaging cavity.

The liquid extraction tube 120 comprises a substantially elongated tubular member defining a liquid extraction inlet 122 (represented in FIG. 3), a liquid extraction outlet 124 (represented in FIG. 3), and a liquid extraction passageway extending there between (not represented in the Figures for simplification purposes). In an exemplary implementation, the liquid extraction tube 120 is a plunger.

The liquid extraction tube 120 is slidably mounted inside the housing 102, so as to be slidably movable between a retracted position and an extended position. In the retracted position, the liquid extraction inlet 122 is retracted within the container engaging inlet port. For example, in the previously mentioned implementation of the container engaging inlet port, the liquid extraction inlet 122 is retracted within the previously mentioned inlet port guide opening of the container engaging inlet port. In the extended position, an end portion of the liquid extraction tube 120, including the liquid extraction tube 122, protrudes from the container engaging inlet port.

The actuator 130 is mounted inside the housing 102. The actuator 130 comprises an actuator drive member 134 (represented in FIG. 3). The actuator drive member 134 is connected to the liquid extraction tube 120, and is adapted for moving the liquid extraction tube 120 between its retracted position and its extended position.

The actuator 130, in cooperation with the liquid extraction tube 120 and the container engaging inlet port, are suitably sized and configured such that, when the ingredient container 110 is engaged in the container engaging inlet port and the liquid extraction tube 120 is in the retracted position, the liquid extraction tube 122 does not contact the ingredient container 110. For example, if the ingredient container 110 comprises the container outlet port 112, the liquid extraction tube 122 does not contact the container outlet port 112. When the liquid extraction tube 120 is in the extended position, the liquid extraction inlet 122 longitudinally engages through the ingredient container 110, so as to be in liquid communication with the interior of the ingredient container 110. For example, if the ingredient container 110 comprises the container outlet port 112, the liquid extraction inlet 122 longitudinally engages through the container outlet port 112.

The ingredient pump 170 is mounted inside the housing 102. The ingredient pump 170 comprises an ingredient pump inlet 172 (represented in FIGS. 3 and 4) in liquid communication with the liquid extraction outlet 124 of the liquid extraction tube 120. The ingredient pump 170 also comprises an ingredient pump outlet 174 (schematically represented in FIG. 4) in liquid communication with a mixing unit ingredient inlet 144 (schematically represented in FIG. 4) of the mixing unit 140.

In an exemplary implementation, the ingredient pump 170 is a peristaltic pump. Peristaltic pumps are well known in the art, particularly in medical contexts. Peristaltic pumps generally comprise a flexible and resilient liquid conduit in liquid communication between the ingredient pump inlet 172 and ingredient pump outlet 174. Peristaltic pumps further comprise a rotating actuator applying a cyclical pressure in a direction along a portion of the flexible conduit, so as to force a liquid flow in the ingredient liquid present in the conduit.

Similarly to medical contexts, the peristaltic pump is used in the context of the present beverage dispensing system 100 for its capability to controllably deliver a relatively small an precise flow of ingredient liquid, as well as for its ease of cleaning (since there is no turbine, piston or moving parts in contact with the pumped liquid).

The mixing unit 140 is mounted inside the housing 102. The mixing unit 140 comprises an internal mixing unit chamber 148 (schematically represented in FIG. 4), the mixing unit water inlet 142, the mixing unit ingredient inlet 144. The mixing unit 140 further comprises the mixing unit outlet 150 (schematically represented in FIG. 4) connected to the mixing unit 140 and extending forwardly from a front surface portion of the housing 102. FIGS. 1 and 2 illustrate an exemplary implementation of the mixing unit outlet 150 consisting of a faucet.

Each one of the mixing unit water inlet 142, mixing unit ingredient inlet 144 and mixing unit outlet 150, is in liquid communication with the interior of the mixing unit chamber 148. The mixing unit outlet 150 comprises an output opening that is suitably adapted for pouring the content of the mixing unit chamber 148 into an underlying user cup or bottle.

The controller 180 is mounted inside the housing 102. The controller 180 is suitably operatively connected and adapted for operatively controlling the water pump 160, the ingredient pump 170, and the actuator 130. FIG. 5 provides a schematic representation of the interactions of the controller 180 with other components (e.g. the water pump 160, the ingredient pump 170 and the actuator 130) of the beverage dispensing system 100.

In an exemplary implementation, the controller 180 consists of any suitable electronic microcontroller. The controller 180 comprises at least some of the following components (not represented in FIG. 5 for simplification purposes): one or more processor, memory, interface inputs and outputs (I/O), and communication capabilities that are generally found in known beverage dispensing systems. Examples of communication capabilities comprise a wireless communication interface (e.g. Bluetooth®, Bluetooth Low Energy (BLE), Wi-Fi, Near Field Communication (NFC), etc.), a wired communication interface (e.g. Ethernet, etc.), or a combination thereof.

The user control interface 190 (schematically represented in FIG. 5, but not represented in FIGS. 1 and 2 for simplification purposes) is mounted on the housing 102 and is in operative communication with the controller 180. The user control interface 190 comprises at least one of a button and Light Emitting Diodes (LEDs), a touch actuated user interface located on the housing 102, a voice actuated user interface mounted inside the housing 102, a remote user interface accessible through a mobile application or equivalent executed on a remote computing device 400 and communicating with the controller 180 through a wired or wireless communication link, or a combination thereof. The user control interface 190 may also comprise a display (e.g. a basic screen, a touch screen allowing interactions with the user, etc.) for displaying information related to the operations of the beverage dispensing system 100.

In an exemplary implementation, the user control interface 190 (comprising buttons and LEDs) is partly accessible along a front surface portion of the housing 102 and the mixing unit outlet (e.g. faucet) 150.

The user control interface 190 and the controller 180 are suitably adapted and configured for at least enabling the user to select a custom beverage, and actuate a start command, either simultaneously or consecutively with the selection of the custom beverage, so as to efficiently mix and deliver the desired custom beverage through the mixing unit outlet (e.g. faucet) 150.

Additional information is usually selectable by the user through the user control interface 190 such as, but not limited to, a desired volume of beverage, a desired intensity of flavor, selecting to be simply served water, etc.

Functionalities of the user control interface 190 may be accomplished (at least partially) through any suitable remote communication arrangements and software applications in cooperative operational relation with the controller 180 and/or user control interface 190. For this purpose, a remote computing device 400 (schematically represented in FIG. 5) interfaces with the controller 180 and/or user control interface 190 via the communication interface of the controller 180. Examples of remote computing devices 400 comprise a smartphone, a tablet, a laptop, a table top computer, etc.

Following is an exemplary sequence of operations of the beverage dispensing system 100 managed via the user control interface 190 and the controller 180. When the beverage dispensing system 100 is powered on, provided with water in the water tank 230, and a user selected ingredient container 110 is engaged in the container engaging inlet port on the housing 102, a user may position a cup or bottle under the mixing unit outlet (e.g. faucet) 150, select a custom beverage through the user control interface 190, and actuate a start command of the beverage dispensing system 100 (the selection and actuation are performed either consecutively or simultaneously).

Following the start command, the controller 180 automatically calculates a suitable time and speed of operation of the water pump 160, and suitable time and speed of operation of the ingredient pump 170, according to the custom beverage selected by the user. The controller 180 also automatically calculates suitable operating parameters of the actuator 130 (e.g. direction of movement, suitable time and speed of operation for each movement, etc.). Once the calculations are completed, the controller 180 applies corresponding commands to both pumps 160 and 170, as well as to the actuator 130, so as to efficiently mix and deliver the desired custom beverage through the mixing unit outlet (e.g. faucet) 150.

Thus, a user may advantageously select to be served a differently flavored custom beverage as desired, by simply engaging in the container engaging inlet port of the beverage dispensing system 100 a removable ingredient container 110 corresponding to the desired flavor. Alternatively, the user may simply select to be served plain water of the water tank 230 (in which case the ingredient pump 170 is not activated by the controller 180).

Optionally, the beverage dispensing system 100 further comprises liquid flow measuring means capable of providing a liquid flow measure of the ingredient liquid entering the mixing unit 140 through the mixing unit ingredient inlet 144.

In a first exemplary implementation, the liquid flow measuring means consists of a time based liquid measuring algorithm executed by the controller 180, based on the operating time of the ingredient pump 170 and a predetermined viscosity value of the ingredient liquid in the ingredient container 110.

In a second exemplary implementation, the liquid flow measuring means consists of a liquid flow meter (not represented in the Figures for simplification purposes) in operative communication with the controller 180. The liquid flow meter measures the flow of liquid circulating from the ingredient container 110 towards the mixing unit 140. For example, the liquid flow meter is coupled in serial liquid communication between the liquid extraction inlet 122 of the liquid extraction tube 120 and the mixing unit 140. The controller 180 instantly actuates the ingredient pump 170 at a predetermined speed of operation following the start command, and calculates the remaining time and speed of operation of the ingredient pump 170, based on the real time liquid flow measurements provided by the liquid flow meter. Thus, the estimated ingredient liquid volume actually delivered into the mixing unit 140 takes into account the current viscosity, fluidity and/or temperature of the ingredient liquid contained in the removable ingredient container 110.

Optionally, consumer data, operational data, statistics and/or maintenance information are exchanged between the controller 180 and a customer database on a remote computing device 400 (e.g. a server), via the communication capabilities provided by the controller 180.

Optionally, the beverage dispensing system 100 comprises a contactless data reader 195 (schematically represented in FIG. 5, but not represented in FIGS. 1 and 2 for simplification purposes) in operative communication with the controller 180 (or directly integrated to the controller 180). The contactless data reader 195 allows the controller 180 to read data from the ingredient container 110 engaged in the container engaging inlet of the beverage dispensing system 100. The ingredient container 110 comprises a component 115 (schematically represented in FIG. 5) capable of storing the data and allowing reading of the data by the contactless data reader 195. The component 115 will be referred to as a tag in the following In an exemplary implementation, the contactless data reader 195 comprises a barcode reader or a quick response (QR) code reader. In an exemplary configuration, the reader is mounted on the housing 102 and is substantially adjacent to the container engaging inlet port. A compatible bar code tag 115 or QR code tag 115 is integrated to the ingredient container 110. In an exemplary configuration, the tag 115 is located along a plane portion of the ingredient container 110. The tag 115 is further positioned so as to allow reading by the bar code reader or QR code reader mounted on the housing 102.

In an alternative or complementary exemplary implementation, the contactless data reader 195 comprises a Radio Frequency Identification (RFID) reader. A corresponding read or read/write RFID tag 115 is integrated to the ingredient container 110.

Examples of data stored by the tag 115 comprise at least some of the following information related to the ingredient liquid present in the ingredient container 110: type of ingredient liquid, flavor, viscosity, density, temperature, remaining level of ingredient liquid in the ingredient container 110, etc. As mentioned previously, the contactless data reader 195 integrated to the beverage dispensing system 100 is capable of reading the information stored via the tag. Optionally, the tag 115 provides the capability of modifying the information stored by the tag 115. In this case, the contactless data reader 195 is also capable of transferring data to the tag 115, to modify at least some of the information stored by the tag 115.

The information collected from or exchanged with the tag 115 can be used by the controller 180 to more accurately determine the appropriate time and speed of operation of the ingredient pump 170, to simplify the choices or information needed to be entered by the user via the user control interface 190, etc. Furthermore, some of the information collected from or exchanged with the tag 115 can be displayed on the display of the user control interface 190 (when the user control interface 190 comprises one).

Optionally, the controller 180 implements a machine learning algorithm (e.g. a neural network) to take decision(s) based on (at least) some of the information stored by the tag 115. For example, in the case of a neural network, a predictive model of the neural network is stored in the memory of the controller 180. The predictive model has been generated during a training phase, using a large amount of training data. When ready, the predictive model is transmitted to the controller 180 via its communication interface and stored in its memory. Using the predictive model, the neural network is capable of predicting the most effective time and/or speed of operation of the ingredient pump 170 based on relevant information read from the tag 115 (e.g. at least some of the type of ingredient, viscosity, density, temperature, remaining level of ingredient liquid, etc.).

Optionally, the data stored by the tag 115 comprise security information. If the required security information is not present or does not have the expected value, the controller 180 prevents the beverage dispensing system 100 from operating. The security information can be used to detect a counterfeit ingredient container 110, to detect an ingredient container 110 that is not compatible with the currently used beverage dispensing system 100, etc.

In an alternative implementation, the tag 115 is comprised in a cap (which will be detailed later in the description) for the ingredient container 110.

Although not represented in the Figures for simplification purposes, an electrical power source powers the components of the beverage dispensing system 100 which need power to operate (the water pump 160, the ingredient pump 170, the controller 180, the user control interface 190, etc.).

The electrical power source may be any suitable electrical power source such as, for example, a 110 Volts Alternative Current (AC) outlet providing electrical power to the components of the system 100 through a conventional control switch and extension cord arrangement, a rechargeable battery mounted inside the housing 102, or a combination thereof.

Furthermore, suitable tubing, molded liquid networks, or a combination thereof, may provide the liquid communications between the various components of the beverage dispensing system 100 as described above.

The beverage dispensing system 100 is further adapted to being cleaned and purged after each serving of a beverage. The cleaning and purging avoid the risks of having ingredient liquid remaining in the beverage dispensing system 100 (more specifically, remaining in other components than the ingredient container 110) between two servings of a beverage. The cleaning and purging also prevents microbiological development in the beverage dispensing system 100. For this purpose, all components of the beverage dispensing system 100 which have been in contact with the ingredient liquid are either rinsed with water (e.g. the ingredient pump 170), or diluted with water (e.g. all components in liquid communication between the mixing unit 140 and the mixing unit outlet 150, including the mixing unit 140 and the mixing unit outlet 150).

To allow cleaning of the ingredient pump 170, a motor of the ingredient pump 170 is adapted to rotate in two opposite directions. When operating the motor in one direction, a suction effect towards the ingredient container 110 is generated, to prepare the beverage. When operating the motor in the other direction, a suction effect towards the mixing unit 140 filled with water is generated, to clean the ingredient pump 170. The suction of water in the ingredient pump 170 allows to rinse with water the ingredient pump 170, in particular the ingredient pump inlet 172 in contact with the ingredient liquid. In an exemplary implementation, alternating a direction of rotation of the motor of the ingredient pump 170 can be used to circulate water in the ingredient pump 170, then evacuate the water from the ingredient pump 170.

Optionally, a container 110 containing a cleaning product can be used to clean the beverage dispensing system 100.

Figure 6A:
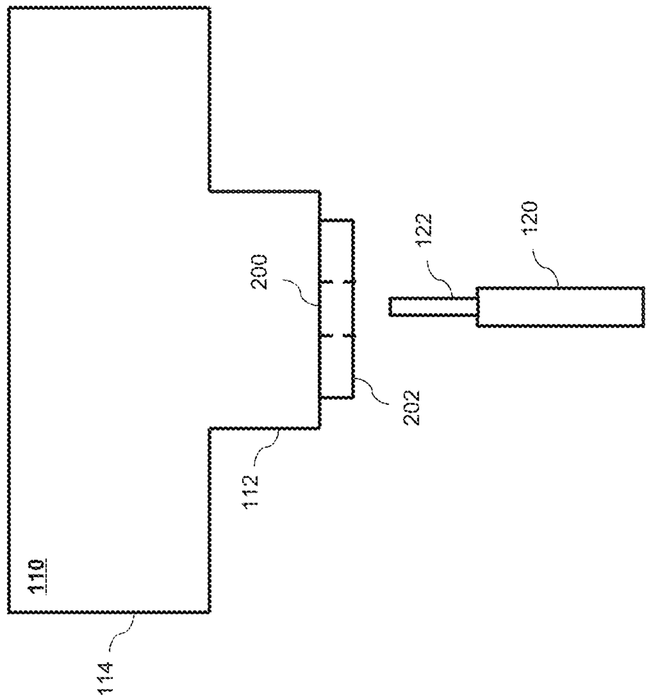
FIGS. 6A, 6B are front views
Figure 6B:
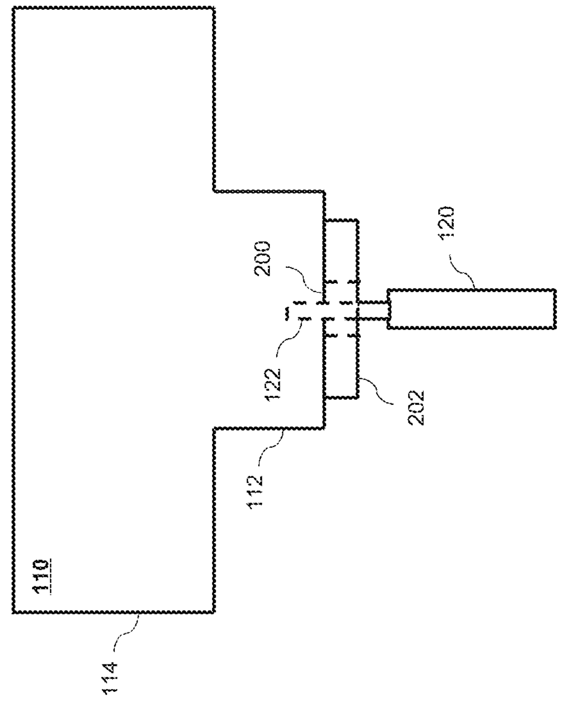
Figure 6C:
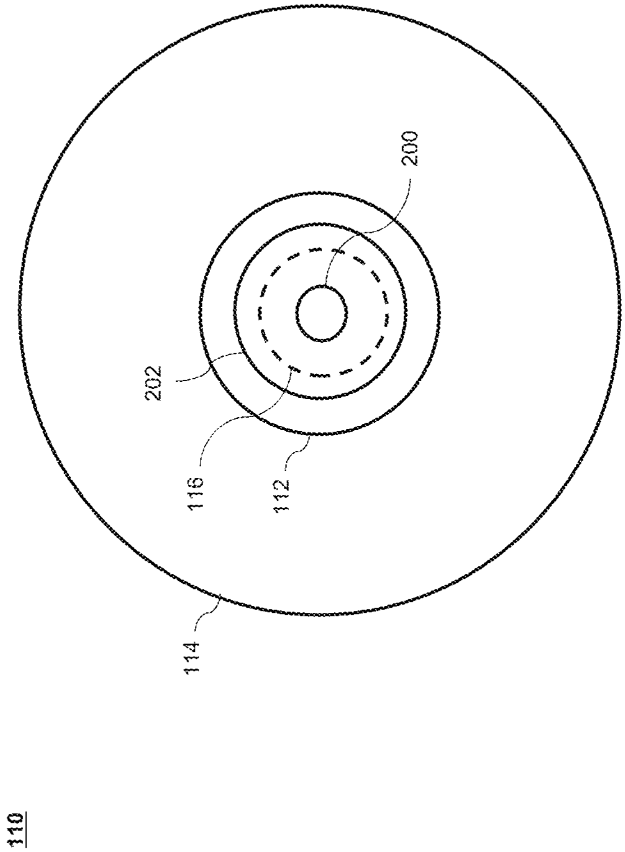
FIG. 6C is a bottom view of an exemplary implementation of an ingredient container of the beverage dispensing system of FIGS. 1 and 2.

Reference is now made concurrently to FIGS. 6A, 6B and 6C, which illustrate an exemplary implementation of the ingredient container 110. FIGS. 6A and 6B are front views of the ingredient container 110, also representing the liquid extraction tube 120 respectively in the retracted an extended positions. FIG. 6C is a bottom view of the ingredient container 110.

As mentioned previously, the ingredient container 110 comprises the casing 114 for storing the ingredient liquid. The casing 114 defines an aperture 116 (illustrated in FIG. 6C) through which the ingredient liquid is extracted from the casing 114.

In the exemplary implementation illustrated in FIGS. 6A-6C, the ingredient container 110 also comprises the previously mentioned container outlet port 112. The aperture 116 is defined on the container outlet port 112 (e.g. on a bottom surface of the container outlet port 112).

The ingredient container 110 comprises a resealable membrane 200 (illustrated in FIGS. 6A-C) covering the aperture 116. The resealable membrane 200 is adapted for receiving the liquid extraction tube 120 therethrough for on-demand liquid extraction from the casing 114 (in the extended position illustrated in FIG. 6B). More specifically, at least a portion of the liquid extraction inlet 122 of the liquid extraction tube 120 is received through the resealable membrane 200. The resealable membrane 200 is generally made of silicon, but may be made of another material (or combination of materials).

The resealable membrane 200 automatically reseals the aperture 116 upon withdrawal of the liquid extraction tube 120 (in the retracted position illustrated in FIG. 6A). More specifically, the resealable membrane 200 automatically reseals the aperture 116 upon withdrawal of the liquid extraction inlet 122 of the liquid extraction tube 120.

The ingredient container 110 also comprises an air permeable membrane 202 (illustrated in FIGS. 6A-C) for balancing a pressure in the casing 114 upon extracting ingredient liquid by the liquid extraction tube 120. The air permeable membrane 202 is made of any material (or combination of materials) having the property of being permeable to air.

In an exemplary design of the ingredient container 110, the casing 114, the resealable membrane 200 and the air permeable membrane 202 are provided as a capsule.

FIGS. 6A-C illustrate a first configuration where the resealable membrane 200 and the air permeable membrane 202 form a single membrane. For example, the aperture 116 and the single membrane respectively form a disc having the same center, the single membrane covering the aperture 116. The resealable membrane 200 forms a disc located at the center of the single membrane. The air permeable membrane 202 forms a taurus located at a periphery of the single membrane, and is concentric to the resealable membrane 200.

FIGS. 6A-C also illustrate a second configuration where the resealable membrane 200 and the air permeable membrane 202 are independent from one another, but are concentric. For example, the aperture 116 forms a disc. The resealable membrane 200 forms a disc located at the center of the aperture 116. The air permeable membrane 202 forms a taurus located at a periphery of the aperture 116, and is concentric to the resealable membrane 200.

FIGS. 6A-C illustrate a configuration where the aperture 116 is covered by both the resealable membrane 200 and the air permeable membrane 202. Alternatively, the casing 114 defines a second aperture (independent of the aperture 116) which is covered by the air permeable membrane 202 (as will be illustrated later in the description).

FIGS. 6A-C illustrate a configuration where the resealable membrane 200 and the air permeable membrane 202 are located outside the casing 114 (more specifically outside the container outlet port 112). Alternatively, the resealable membrane 200 and the air permeable membrane 202 are located inside the casing 114 (more specifically inside the container outlet port 112). This configuration is not represented in the Figures.

The content of the ingredient container 110 being generally a viscous liquid, the design of the resealable membrane 200 is adapted to prevent any leak to occur when the ingredient pump 170 (illustrated in FIGS. 1 and 2) is stopped and, substantially concurrently, the liquid extraction tube 120 is moved back to its retracted position, thus saleably closing the resealable membrane 200. Hence, an ingredient container 110 still having some ingredient liquid therein may be removed from the beverage dispensing system 100 (illustrated in FIGS. 1 and 2) in wait of future usage(s) thereof until it is emptied. The removed ingredient container 110 is not subject to leaking of the remaining ingredient liquid therein.

In an exemplary implementation, the resealable membrane defines a cross-slit valve structure, or equivalent, suitably configured for allowing the liquid extraction tube 120 to be selectively inserted and retracted through the membrane 200, without provoking any loss of ingredient liquid from the ingredient container 110, even when the ingredient container 110 still comprises liquid after retraction of the liquid extraction tube 120. The cross-slit valve structure has an overall diameter that is at least slightly greater than the diameter of the liquid extraction tube 120. Thus, when the liquid extraction tube 120 is moved to its extended position into the cross-slit valve structure, the latter is at least slightly spread open. In turn, this spreading of the cross-slit valve structure in the membrane 200 inherently creates a plurality of relatively small triangular vent openings in an equidistantly spaced apart relationship around the liquid extraction tube 120. These relatively small triangular vent openings allow ambient air to enter the otherwise airtight ingredient container 110 when its content is actively vacuumed into the liquid extraction tube 120 introduced therein. With this particular implementation, the small triangular vent openings may be sufficient for balancing the pressure in the ingredient container 110 upon extracting liquid by the liquid extraction tube 120, in which case the air permeable membrane 202 is not used.

In another exemplary implementation, the liquid extraction tube 120 includes a vent conduit (not represented in the Figures) extending proximally parallelly relative to substantially the whole longitudinal length of the liquid extraction passageway of the liquid extraction tube 120, so as to prevent a vacuum build-up into the ingredient container 110, particularly when the ingredient in the ingredient container 110 is a syrup-like viscous liquid. The vent conduit allows ambient air to be vacuumed into the ingredient container 110 as its viscous liquid is extracted through the liquid extraction inlet 122 of the liquid extraction tube 120. As is well known in the art of olive spouts, such a vent conduit may be implemented by a tubular member extending along an inner longitudinal surface of the liquid extraction passageway of the liquid extraction tube 120, by a vent passageway integrally formed into and along a sidewall of the liquid extraction tube 120, or along an outer longitudinal surface portion thereof. In an embodiment of the vent conduit, likewise well known in the art of olive spouts, an elongated end portion thereof extends longitudinally parallelly, and at least slightly distally further away, relative to the liquid extraction inlet 122 of the liquid extraction tube 120, such that once the vent conduit and the liquid extraction inlet 122 are cooperatively inserted through the cross-slit of the ingredient container 110, the air vacuumed through the vent tube and into the ingredient container 110 is not simultaneously sucked into the adjacent liquid extraction inlet 122 of the liquid extraction tube 120. With this particular implementation, the vent conduit may be sufficient for balancing the pressure in the ingredient container 110 upon extracting liquid by the liquid extraction inlet 122, in which case the air permeable membrane 202 is not used.

Figure 7A:
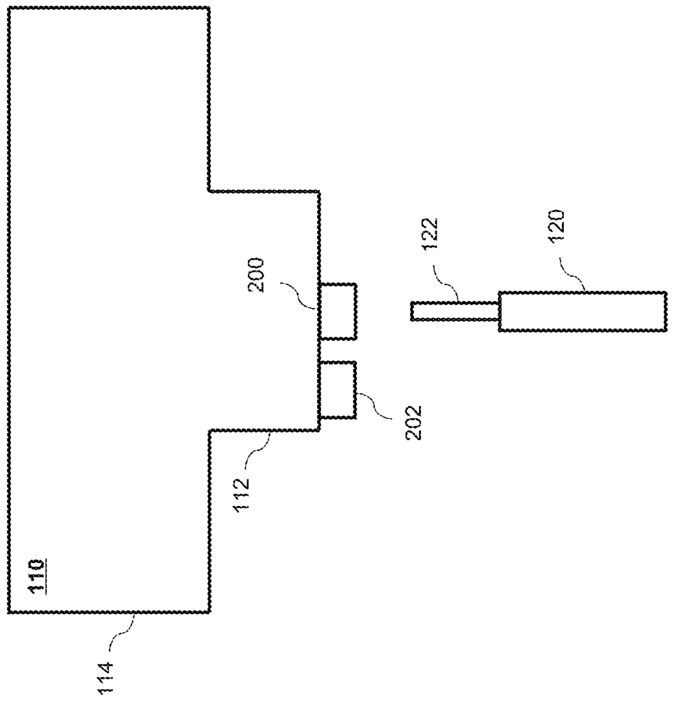
FIGS. 7A, 7B are front views
Figure 7B:
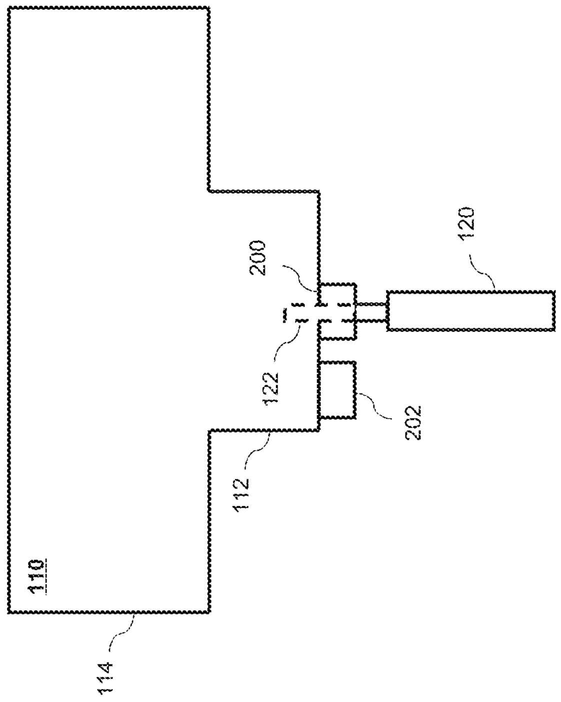
Figure 7C:
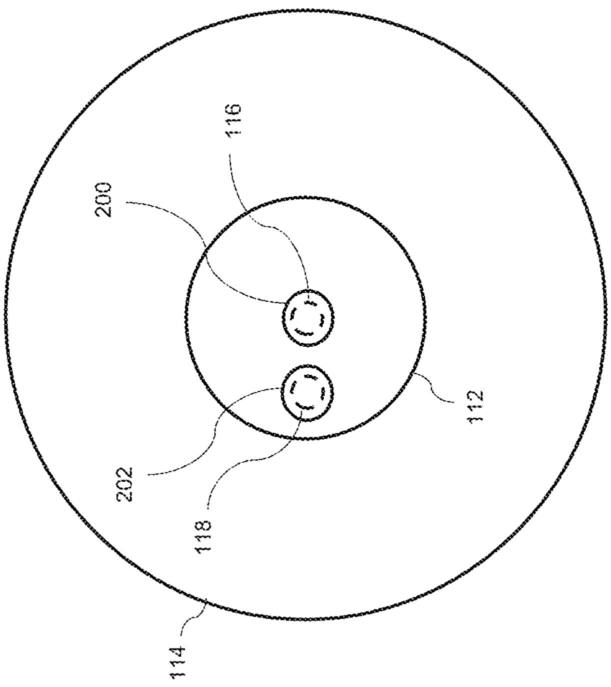
FIG. 7C is a bottom view of another exemplary implementation of the ingredient container of the beverage dispensing system of FIGS. 1 and 2.

Reference is now made concurrently to FIGS. 7A, 7B and 7C, which illustrate another exemplary implementation of the ingredient container 110. FIGS. 7A and 7B are front views of the ingredient container 110, also representing the liquid extraction tube 120 respectively in the retracted an extended positions. FIG. 7C is a bottom view of the ingredient container 110.

The ingredient container 110 illustrated in FIGS. 7A-C is similar to the one illustrated in FIGS. 6A-C, except for the casing 114 defining a second aperture 118. The air permeable membrane 202 covers the secondary aperture 118.

In the exemplary implementation illustrated in FIGS. 7A-7C, the ingredient container 110 comprises the container outlet port 112. The second aperture 118 is defined on the container outlet port 112 (e.g. on a bottom surface of the container outlet port 112).

FIGS. 7A-C illustrate a configuration where the resealable membrane 200 and the air permeable membrane 202 are independent from one another, and are not concentric. For example, the aperture 116 and the second aperture 118 form respective discs. The aperture 116 is located at a center of a bottom surface of the container outlet port 112. The second aperture 118 is located at a periphery of the bottom surface of the container outlet port 112. The resealable membrane 200 forms a disc covering the aperture 116. The air permeable membrane 202 forms a disc covering the second aperture 118.

Figure 8A:
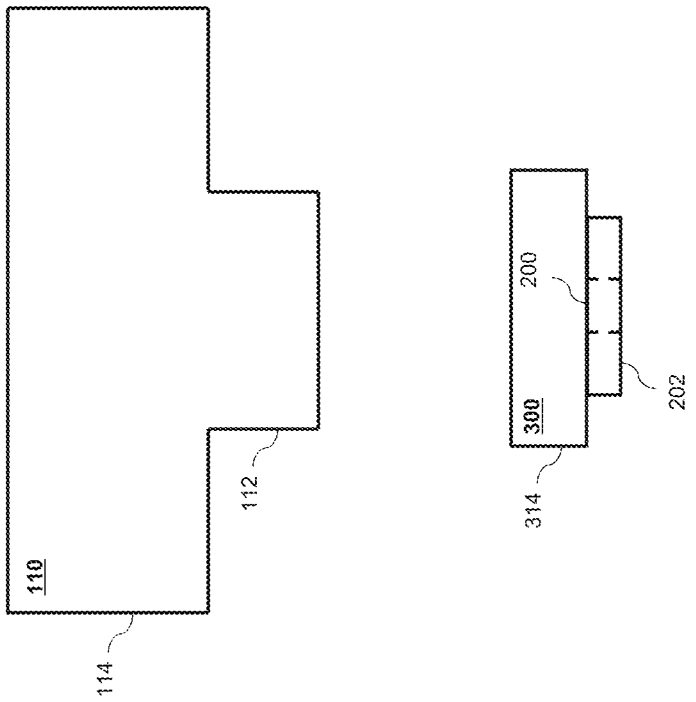
FIGS. 8A, 8C, 8D are front views
Figure 8B:
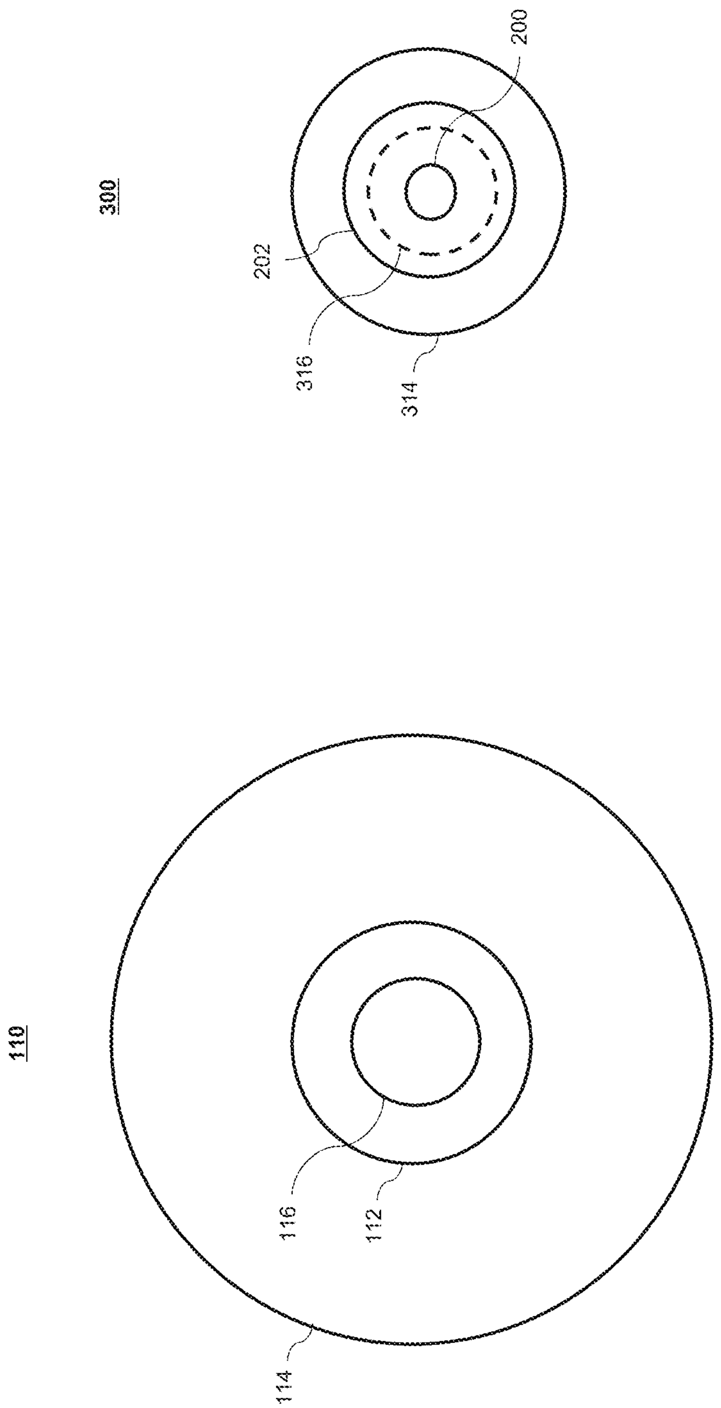
FIG. 8B is a bottom view of still another exemplary implementation of the ingredient container of the beverage dispensing system of FIGS. 1 and 2 with an affixable cap.
Figure 8C:
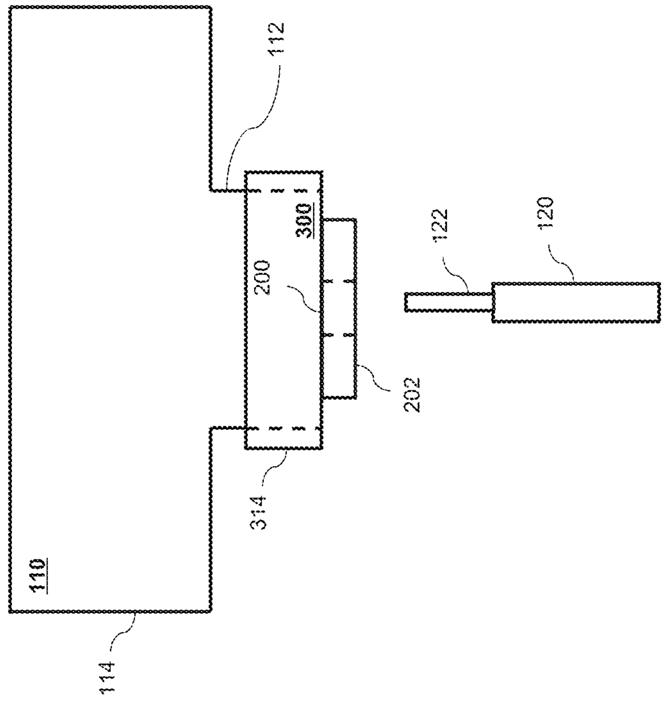
Figure 8D:
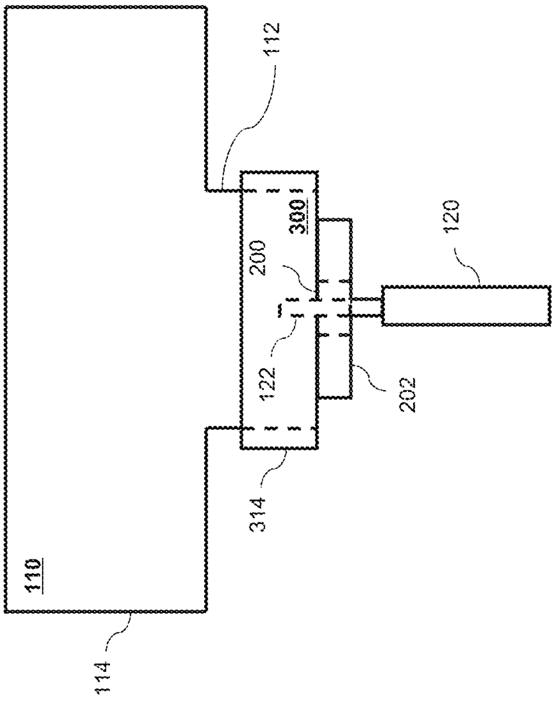

Reference is now made concurrently to FIGS. 8A, 8B, 8C and 8D, which illustrate still another exemplary implementation of the ingredient container 110. FIG. 8A is a front view and FIG. 8B is a bottom view of the ingredient container 110, also representing a cap 300 currently not affixed to the ingredient container 110. FIGS. 8C and 8D are front views of the ingredient container 110 and cap 300 currently affixed to the ingredient container 110, also representing the liquid extraction tube 120 respectively in the retracted an extended positions.

The ingredient container 110 illustrated in FIGS. 8A-D is similar to the one illustrated in FIGS. 6A-C, except for the resealable membrane 200 and the air permeable membrane 202 being provided as the cap 300 for closing the aperture 116 of the casing 114 of the ingredient container 110.

The cap 300 comprises a body 314 (illustrated in FIGS. 8A-D) adapted to be affixed to the ingredient container 110. In the exemplary implementation illustrated in FIGS. 8A-D, the ingredient container 110 also comprises the previously mentioned container outlet port 112. The body 314 is adapted to be affixed to container outlet port 112 of the ingredient container 110. For instance, the body 314 comprises an inner threading adapted for affixing at least a portion of the container outlet port 112 inside the body 314 (as illustrated in FIGS. 8A-D). Alternatively, the body 314 comprises an outer threading adapted for affixing at least a portion of the body 314 inside the container outlet port 112.

The body 314 defines a complementary aperture 316 (illustrated in FIG. 8B). The complementary aperture 316 is adapted to cover the aperture 116 of the ingredient container 110 when the body 314 of the cap 300 is affixed to the ingredient container 110. The ingredient liquid is extracted from the casing 114 through the aperture 116 of the ingredient container 110 and the complementary aperture 316 of the cap 300.

The cap 300 comprises the resealable membrane 200 (illustrated in FIGS. 8A-D) covering the complementary aperture 316 of the cap 300. The resealable membrane 200 is adapted for receiving the liquid extraction tube 120 therethrough for on-demand liquid extraction from the casing 114 (in the extended position illustrated in FIG. 8D). More specifically, at least a portion of the liquid extraction inlet 122 of the liquid extraction tube 120 is received through the resealable membrane 200.

The resealable membrane 200 automatically reseals the complementary aperture 316 of the cap 300 upon withdrawal of the liquid extraction tube 120 (in the retracted position illustrated in FIG. 8C). More specifically, the resealable membrane 200 automatically reseals the complementary aperture 316 of the cap 300 upon withdrawal of the liquid extraction inlet 122 of the liquid extraction tube 120.

The cap 300 also comprises the air permeable membrane 202 (illustrated in FIGS. 8A-D) for balancing a pressure in the casing 114 upon extracting ingredient liquid by the liquid extraction tube 120.

As previously described in relation to FIGS. 6A-C, FIGS. 8A-D illustrate a first configuration where the resealable membrane 200 and the air permeable membrane 202 form a single membrane. For example, the complementary aperture 316 of the cap 300 and the single membrane respectively form a disc having the same center, the single membrane covering the complementary aperture 316. The resealable membrane 200 forms a disc located at the center of the single membrane. The air permeable membrane 202 forms a taurus located at a periphery of the single membrane, and is concentric to the resealable membrane 200.

As previously described in relation to FIGS. 6A-C, FIGS. 8A-D also illustrate a second configuration where the resealable membrane 200 and the air permeable membrane 202 are independent from one another, but are concentric. For example, the complementary aperture 316 of the cap 300 forms a disc. The resealable membrane 200 forms a disc located at the center of the complementary aperture 316. The air permeable membrane 202 forms a taurus located at a periphery of the complementary aperture 316, and is concentric to the resealable membrane 200.

FIGS. 8A-D illustrate a configuration where the complementary aperture 316 of the cap 300 is covered by both the resealable membrane 200 and the air permeable membrane 202. Alternatively, as previously described in relation to FIGS. 7A-C, the body 314 of the cap 300 defines a second complementary aperture (independent of the complementary aperture 316) which is covered by the air permeable membrane 202. The configuration of the cap 300 with both the complementary aperture 316 and second complementary aperture is not represented in the Figures, but can be easily adapted by a person skilled in the art from the configuration illustrated in FIGS. 7A-C. In addition to the complementary aperture 316 defined in the body 314 of the cap 300 covering the aperture 116 of the ingredient container 110, the second complementary aperture defined in the body 314 of the cap 300 covers the second aperture 118 (illustrated in FIG. 7C) of the ingredient container 110.

FIGS. 8A-D illustrate a configuration where the resealable membrane 200 and the air permeable membrane 202 are located outside the body 314 of the cap 300. Alternatively, the resealable membrane 200 and the air permeable membrane 202 are located inside the body 314 of the cap 300. This configuration is not represented in the Figures.

As mentioned previously, the tag 115 illustrated in FIG. 5 may be integrated to the body 314 of the cap 300 instead of the casing 114 of the ingredient container 110.

The usage of the resealable membrane 200 without the cap 300 (as illustrated in FIGS. 6A-C and 7A-C) or in combination with the cap 300 (as illustrated in FIGS. 8A-D) provides the following advantages: the ingredient container 110 can be easily cleaned, refilled and/or have its membrane 200 replaced with a new one. Furthermore, a user may selectively replace a first ingredient container 110 actively engaged in the container engaging inlet port with another ingredient container 110 having a different content, even though the first ingredient container 110 is not yet empty. Other types of removable container engaging arrangements (known in the art of beverage dispensing systems) may be used in place of the container engaging inlet port (for example, a bayonets engaging arrangement, a threaded engaging arrangement, a releasable press-and-lock engaging arrangement, etc.).

Figure 9A:
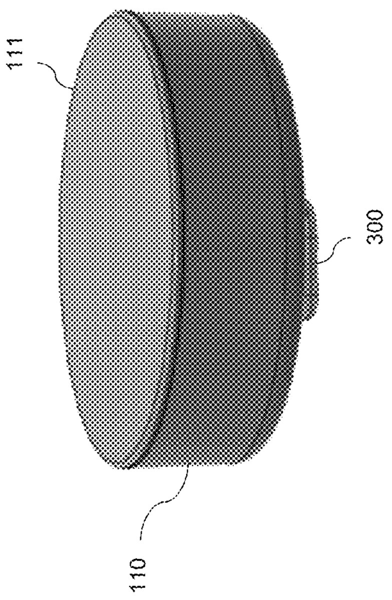
FIGS. 9A, 9B and 9C are different perspective views of exemplary ingredient container and cap based on the implementation of FIGS. 8A-D.
Figure 9B:
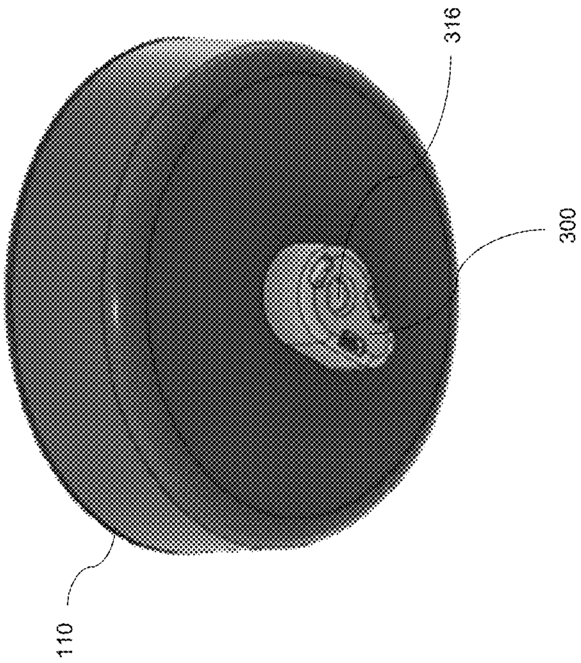
Figure 9C:
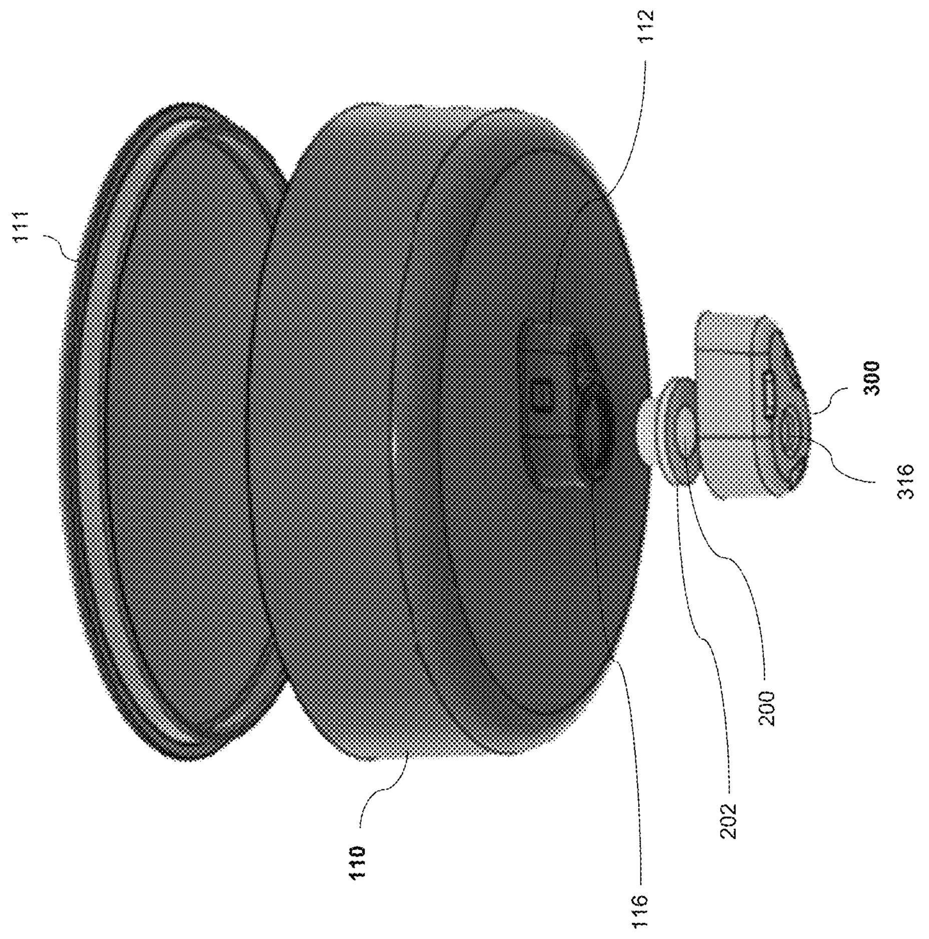

Reference is now made concurrently to FIGS. 9A, 9B, and 9C, which provide different perspective views of an exemplary ingredient container 110 and exemplary cap 300, based on the implementation illustrated in FIGS. 8A-D. The ingredient container 110 comprises the container outlet port 112. The ingredient container 110 also comprises a top removable member 111, which can be removed as illustrated in FIG. 9C, and which is otherwise secured to the ingredient container 110 as illustrated in FIG. 9A.

FIGS. 9A-C are illustrative of the aforementioned exemplary configuration where the resealable membrane 200 and the air permeable membrane 202 form a single membrane. FIGS. 9A-C are also illustrative of the aforementioned exemplary configuration where the resealable membrane 200 and the air permeable membrane 202 are independent from one another, but are concentric. The resealable membrane 200 and the air permeable membrane 202 are positioned inside the cap 300, and are adapted to cover the secondary aperture 316 of the cap 300 and the aperture 116 of the container outlet port 112.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A container for storing a liquid and allowing extraction of the liquid on-demand, the container comprising:

a casing for storing the liquid, the casing defining an aperture;

a resealable membrane covering the aperture of the casing, the resealable membrane being adapted for receiving a liquid extraction tube therethrough for on-demand liquid extraction from the casing, the resealable membrane automatically resealing the aperture upon withdrawal of the liquid extraction tube; and an air permeable membrane for balancing a pressure in the casing upon extracting liquid by the liquid extraction tube.

2. The container of claim 1, wherein the resealable membrane and the air permeable membrane are provided as a cap for closing the aperture of the casing.

3. The container of claim 1, wherein the casing, the resealable membrane and the air permeable membrane are provided as a capsule.

4. The container of claim 1, wherein the casing defines a second aperture, the air permeable membrane covering the second aperture of the casing.

5. The container of claim 1, wherein the resealable membrane and the air permeable membrane form a single membrane.

6. The container of claim 1, wherein the resealable membrane and the air permeable membrane are concentric.

7. The container of claim 1, wherein the casing comprises an outlet port, the outlet port being adapted for releasable engagement into a corresponding inlet port of a beverage dispensing system, the aperture being defined by the outlet port.

8. The container of claim 1, further comprising a tag storing data related to the container, the tag allowing reading and optionally writing of the data by a contactless data reader.

9. A cap for a container, the cap comprising:

a body adapted for being affixed to the container, the body defining a complementary aperture, the complementary aperture covering an aperture of the container when the body is affixed to the container;

a resealable membrane covering the complementary aperture of the body, the resealable membrane being adapted for receiving a liquid extraction tube therethrough for on-demand liquid extraction of a liquid stored in the container, the resealable membrane automatically resealing the complementary aperture upon withdrawal of the liquid extraction tube; and an air permeable membrane for balancing a pressure in the container upon extracting liquid by the liquid extraction tube.

10. The cap of claim 9, wherein the body defines a second complementary aperture, the air permeable membrane covering the second complementary aperture of the body.

11. The cap of claim 9, wherein the resealable membrane and the air permeable membrane form a single membrane.

12. The cap of claim 9, wherein the resealable membrane and the air permeable membrane are concentric.

13. The cap of claim 9, further comprising a tag storing data related to the container, the tag allowing reading and optionally writing of the data by a contactless data reader.

14. A multi-servings beverage dispensing system comprising:

a container engaging inlet port adapted for removably engaging a container;

the container engaged in the container engaging inlet port, the container comprising:

a casing storing an ingredient liquid, the casing defining an aperture;

a resealable membrane covering the aperture of the casing, the resealable membrane being adapted for receiving a liquid extraction tube therethrough for on-demand ingredient liquid extraction from the casing, the resealable membrane automatically resealing the aperture upon withdrawal of the liquid extraction tube; and an air permeable membrane for balancing a pressure in the casing upon extracting ingredient liquid by the liquid extraction tube;

the liquid extraction tube slidably movable between a retracted position and an extended position, the liquid extraction tube not being in contact with the resealable membrane when in the retracted position, an end portion of the liquid extraction tube being received through the resealable membrane when in the extended position;

an actuator adapted for moving the liquid extraction tube between the retracted position and the extended position;

means for transferring the ingredient liquid extracted from the casing by the liquid extraction tube to a mixing unit;

a tank for storing another liquid;

means for transferring the other liquid from the tank to the mixing unit;

the mixing unit for receiving and mixing the ingredient liquid transferred to the mixing unit and the other liquid transferred to the mixing unit; and a mixing unit outlet for pouring a content of the mixing unit.

15. The multi-servings beverage dispensing system of claim 14, wherein the means for transferring the ingredient liquid extracted from the casing by the liquid extraction tube to the mixing unit and the means for transferring the other liquid from the tank to the mixing unit respectively comprise an ingredient pump and another pump.

16. The multi-servings beverage dispensing system of claim 14, further comprising a controller, the controller comprising electronic means for controlling operations of the beverage dispensing unit.

17. The beverage dispensing system of claim 16, wherein the means for transferring the ingredient liquid extracted from the casing by the liquid extraction tube to the mixing unit and the means for transferring the other liquid from the tank to the mixing unit respectively comprise an ingredient pump and another pump; the controller automatically calculating respective time and speed of operation of the other pump, and respective time and speed of operation of the ingredient pump.

18. The multi-servings beverage dispensing system of claim 16, wherein the controller is adapted to exchange information with a remote computing device via a communication interface of the controller.

19. The multi-servings beverage dispensing system of claim 14, wherein the container further comprises a tag storing data related to the container, the beverage dispensing system further comprising a contactless data reader adapted for reading and optionally writing the data stored by the tag.

20. The multi-servings beverage dispensing system of claim 14, wherein the resealable membrane and the air permeable membrane are provided as a cap for closing the aperture of the casing; or the casing, the resealable membrane and the air permeable membrane are provided as a capsule.

* * * * *